United States Patent
Takeyama et al.

(10) Patent No.: US 7,410,515 B2
(45) Date of Patent: Aug. 12, 2008

(54) REFORMER, METHOD FOR MANUFACTURING THE REFORMER, AND POWER GENERATION SYSTEM

(75) Inventors: Keishi Takeyama, Hamura (JP); Osamu Nakamura, Kodaira (JP)

(73) Assignee: Casio Computer Co., Ltd., Tokyo (JP)

( * ) Notice: Subject to any disclaimer, the term of this patent is extended or adjusted under 35 U.S.C. 154(b) by 406 days.

(21) Appl. No.: 10/648,857

(22) Filed: Aug. 25, 2003

(65) Prior Publication Data

US 2004/0043263 A1  Mar. 4, 2004

(30) Foreign Application Priority Data

Aug. 29, 2002  (JP) ............................. 2002-250561

(51) Int. Cl.
*B01J 8/00* (2006.01)
*B01D 53/86* (2006.01)

(52) U.S. Cl. .................. 48/127.9; 48/61; 422/177; 423/219; 423/230

(58) Field of Classification Search ............... 48/61; 422/129, 187
See application file for complete search history.

(56) References Cited

U.S. PATENT DOCUMENTS

| | | | |
|---|---|---|---|
| 6,562,496 B2* | 5/2003 | Faville et al. | 429/13 |
| 2002/0081471 A1* | 6/2002 | Keegan et al. | 429/25 |
| 2002/0110712 A1* | 8/2002 | Struthers et al. | 429/19 |
| 2003/0015093 A1* | 1/2003 | Wegeng et al. | 95/114 |

* cited by examiner

*Primary Examiner*—Alexa D. Neckel
*Assistant Examiner*—Kaity Handal
(74) *Attorney, Agent, or Firm*—Frishauf, Holtz, Goodman & Chick, P.C.

(57) ABSTRACT

A reformer is provided which includes a micro reactor having a flow path for a fluid. A container accommodates the micro reactor and keeps an atmosphere on a periphery of the micro reactor at a pressure of not more than 1 Pa.

12 Claims, 9 Drawing Sheets

REFORMER, METHOD FOR MANUFACTURING THE REFORMER, AND POWER GENERATION SYSTEM

CROSS-REFERENCE TO RELATED APPLICATIONS

This application is based upon and claims the benefit of priority from the prior Japanese Patent Application No. 2002-250561, filed Aug. 29, 2002 the entire contents of which are incorporated herein by reference.

BACKGROUND OF THE INVENTION

1. Field of the Invention

The present invention relates to a reformer or reforming apparatus which reforms a raw material to be reformed containing hydrocarbons, and further relates to a method for manufacturing the reformer and a power generation system comprising the reformer.

2. Description of the Related Art

In recent years, small-sized electronic devices such as portable telephones, notebook-sized personal computers, digital cameras, PDAs (Personal Digital Assistants) and electronic diaries have been advanced and developed. Primary cells such as an alkaline dry cell and a manganese dry cell, and secondary cells such as a nickel-cadmium storage cell, a nickel-metal-hydride storage cell and a lithium ion battery are used as electric sources for the small-sized electronic devices. Energy has not always been effectively utilized if the primary cells and secondary cells are verified in terms of effective utilization of energy.

Therefore, fuel cells are keenly researched and developed to replace the primary cells and secondary cells, as the fuel cells can accomplish high efficiency of energy use. The fuel cell is a device which electrochemically reacts a fuel with oxygen in the atmosphere to directly draw electric energy from chemical energy. Hydrogen can be cited as the fuel used for the fuel cells, but has problems of handling and storage amount because it is gas at ordinary temperature. The fuel cell using a liquid fuel as the fuel includes types as follows: a reforming type which reacts the liquid fuel and high-temperature water vapor to draw hydrogen necessary for power generation, and a direct type which directly supplies the fuel to the fuel cell.

If the reforming type fuel cell is used as the power source for the small-sized electronic device, not only the fuel cell but also the reformer need to be small-sized. Therefore, small-sized reformers have been developed in recent years.

The reformer is a reactor which causes a reaction of predetermined chemical substances, and the inside of the reformer is heated to promote the reaction. In this case, the reformer is required to improve heat generation efficiency for its small size.

An advantage of the present invention is to effectively heat a reaction container to promote a reaction.

BRIEF SUMMARY OF THE INVENTION

For example, as shown in FIG. 5, a reformer according to one aspect of the present invention comprises:

a micro reactor in which a flow path is formed for a fluid to flow inside, and a container which accommodates the micro reactor and keeps an atmosphere on a periphery of the micro reactor at pressure lower than external pressure.

Furthermore, for example, as shown in FIGS. 1 and 6, a power generation system comprises: a reformer which comprises a micro reactor in which a flow path is formed for a fluid to flow inside, and a container which accommodates the micro reactor and keeps an atmosphere on a periphery of the micro reactor at pressure lower than external pressure; and a fuel cell which generates electricity with the fluid reformed by the reformer.

In such reformer and power generation system, components such as water adsorbed by a member disposed on an inner wall of the container or in the container are previously volatilized before an actual operation of the micro reactor and thus removed from inside the container. Therefore, in the actual operation of the reformer, a small amount of media which propagates heat outside exists inside the container, and convention can be restricted which is caused by a temperature difference due to heating inside the container, and thus temperature decrease due to outward propagation of heat can be reduced. In this way, the micro reactor can be efficiently heated, and electric power can be saved especially when electric power is used as heating means for the micro reactor. Further, a reaction starting time required before a reaction starts in the micro reactor can be shortened.

Another reformer according to another aspect of the present invention comprises: a micro reactor in which a flow path is formed for a fluid to flow inside; a container which accommodates the micro reactor and keeps an atmosphere on a periphery of the micro reactor at pressure lower than external pressure; and adsorption means for adsorbing a medium which exists inside the container and propagates heat.

In this reformer, a heat transfer medium such as water existing inside the container can be adsorbed by the adsorption means during the operation of the reformer. It is possible to ensure that components such as water inside the container are inhibited from volatilizing to increase inner pressure in the container, and that heat flowing out of the micro reactor due to convection inside the container is reduced.

A method for manufacturing a reformer according to further aspect of the present invention comprises the steps of: depressurizing an atmosphere in a chamber where a micro reactor in which a flow path is formed for a fluid to flow inside, and a container for accommodating the micro reactor are installed; and accommodating the micro reactor in the container in a state where the atmosphere in the container is at the same pressure as the atmosphere in the chamber.

Another method for manufacturing a reformer according to further aspect of the present invention comprises the steps of: heating an atmosphere in a chamber where a micro reactor in which a flow path is formed for a fluid to flow inside, and a container for accommodating the micro reactor are installed; and accommodating the micro reactor in the container in a state of the heated atmosphere.

The micro reactor is accommodated in the container under a depressurized atmosphere or under a heated atmosphere, so that concentration of medium which transfers heat is low in the container, and heat generated when the micro reactor heats the fluid to cause a chemical reaction can be inhibited from propagating outside the container.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will hereinafter be described with reference to the drawings. However, the scope of the invention is not limited to illustrated examples.

First Embodiment

Figure 1:
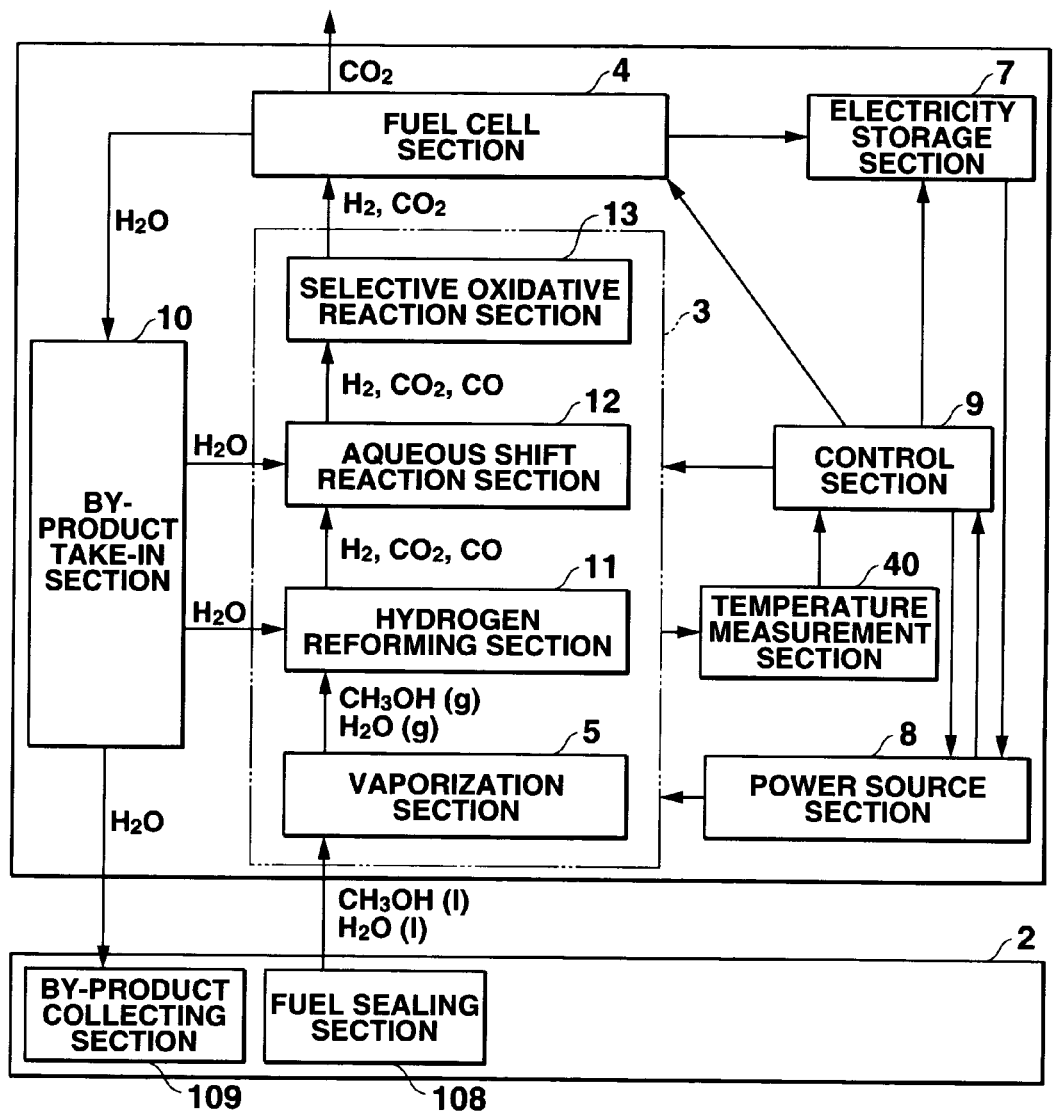
FIG. 1 is a block diagram showing an outline of a power generation system according to a first embodiment.
Figure 2:
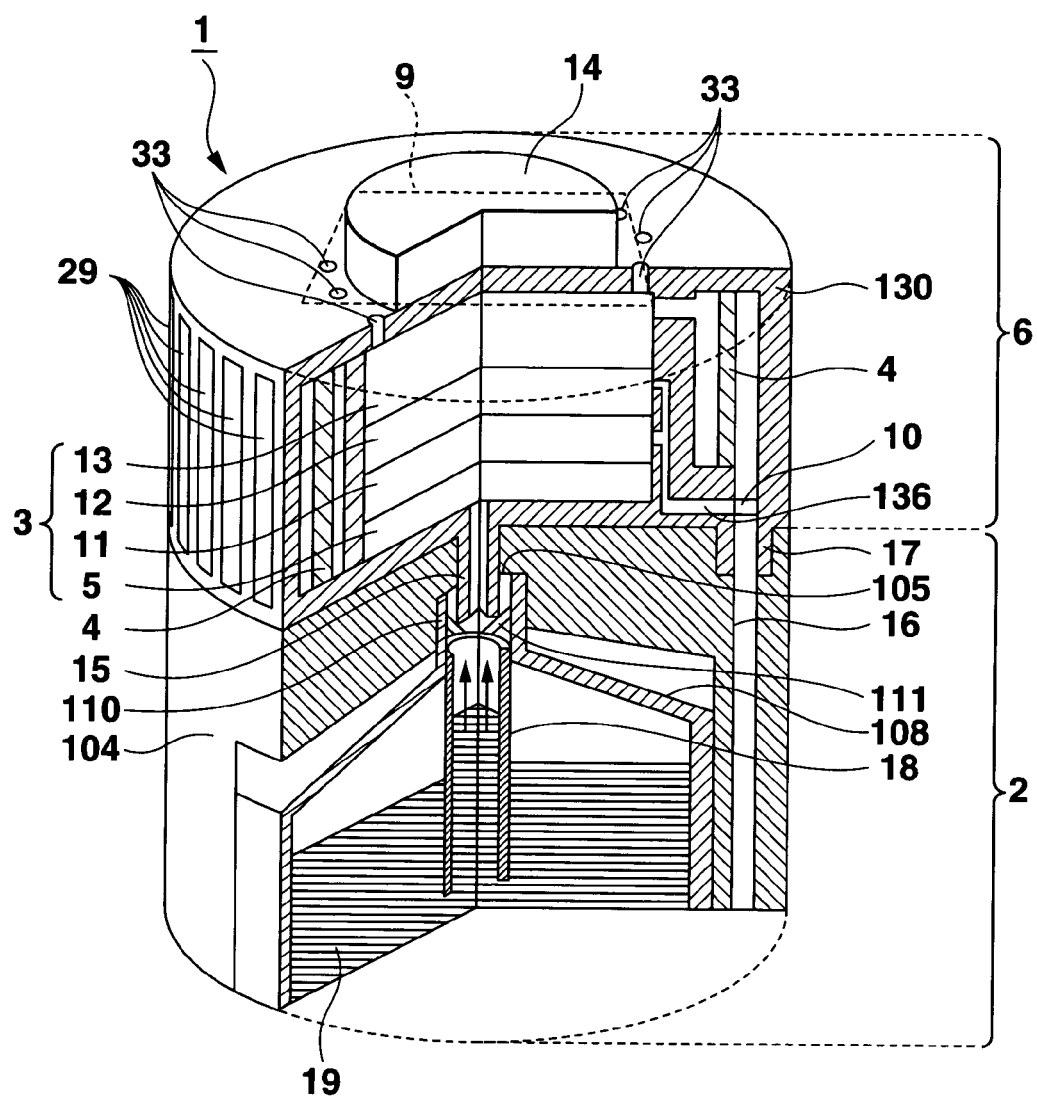
FIG. 2 is a schematic sectional view showing a configuration of the power generation system according to the first embodiment.

FIG. 1 is a block diagram showing a basic configuration of a power generation system 1 using a reformer 3 according to the present invention, and FIG. 2 is a schematic perspective view showing an internal configuration of the power generation system 1. The power generation system 1 comprises a fuel container 2 storing a fuel 19, and a power generation module 6 which is detachable from the fuel container 2 and generates electricity by use of the fuel 19 in the fuel container 2.

The power generation module 6 has the built-in reformer 3, and the reformer 3 comprises a vaporization section 5, a hydrogen reforming section 11, an aqueous shift reaction section 12 and a selective oxidative reaction section 13 that each have a micro reactor (described later) manufactured by a manufacturing method of the present invention.

The fuel container 2 has a substantially cylindrical case 104. The case 104 can be detachably attached to the power generation module 6. A round through-hole 105 is formed at a head top portion of the case 104. A first drain pipe 16 which allows by-product water produced by the power generation module 6 to flow is formed in an outer peripheral wall of the case 104. A by-product collecting section 109 (FIG. 1) which stores water to be drained is disposed at a bottom of the fuel container 2, and this by-product collecting section 109 is connected to the first drain pipe 16.

A fuel sealing section 108 is housed inside the case 104, and part of an outer peripheral surface of the fuel sealing section 108 is exposed outside the case 104. The liquid fuel 19 is stored inside the fuel sealing section 108. The part of the fuel sealing section 108 exposed from the case 104 is transparent or semitransparent, and an outer shape thereof is almost columnar. It is therefore possible to easily check the presence and remaining amount of the fuel 19 in a state where the fuel sealing section 108 is built in the fuel container 2. The fuel sealing section 108 is detachable from the case 104, so that, for example, by forming the fuel sealing section 108 of a biodegradable material degraded by bacteria or the like, no adverse effect is caused to the environment if the fuel sealing section 108 is removed from the case 104 when the fuel 19 inside runs down to dispose of only the fuel sealing section 108. The by-product collecting section 109 may be formed integrally with the fuel sealing section 108 so that the by-product collecting section 109 and the fuel sealing section 108 can be removed from the case 104 at the same time.

The fuel 19 is a mixture of a liquid chemical fuel and water, and alcohols such as methanol and ethanol or carbon compounds containing a hydrogen element such as diethyl ether and gasoline are applicable as the chemical fuel. In the present embodiment, a mixture in which methanol and water are equally mixed is used as the fuel 19.

A supply port 110 for supplying the fuel 19 to the power generation module 6 is provided at the head top portion of the fuel sealing section 108 in a manner to protrude to be inserted into the through-hole 105 of the case 104. A check valve 111 is provided inside the supply port 110, which closes the entire supply port 110 in a state where an intake pipe 15 of the power generation module 6 is not inserted. A supply pipe 18 extending in upward and downward directions to be inserted in the supply port 110 in FIG. 2 is provided inside the fuel sealing section 108. The supply pipe 18 extends from the bottom of the fuel sealing section 108 to a position immediately under the check valve 111 in the supply port 110. The supply pipe 18 has a function to send the fuel 19 to the supply port 110 by a capillary phenomenon. The check valve 111 is made of an elastic material such as rubber, and structured to close the supply port 110 by restoring force so as to prevent the fuel 19 from leaking from the fuel sealing section 108 to the outside, when the fuel sealing section 108 is removed from the case 104.

The power generation module 6 has a substantially cylindrical case 130; the reformer 3 which is disposed inside the case 130 and reforms the chemical fuel; a fuel cell section 4 which is disposed on a periphery of the reformer 3 and on an outer peripheral side of the case 130, and generates electricity with the reformed fuel; an electricity storage section 7 which stores electric power generated by the fuel cell section 4 and outputs it as necessary; a power source section 8 which distributes the electric power supplied by the electricity storage section 7 into the power generation module 6; a by-product take-in section 10 which takes in part of the by-product produced by the fuel cell section 4 and supplies this to the reformer 3 as necessary; a temperature measurement section 40 which measures the temperature of the reformer 3; and a control section 9 which electronically controls the reformer 3, the fuel cell section 4, the electricity storage section 7, the power source section 8 and the by-product take-in section 10.

A plurality of slits 29 for supplying oxygen in the air outside the power generation module 6 that is needed for power generation by the fuel cell section 4 to the fuel cell section 4 are formed in a state arranged in parallel with each other outside the fuel cell section 4 and on an outer peripheral surface of the case 130.

A terminal 14 for supplying electric energy generated by the fuel cell section 4 to an external device is provided at the head top portion of the case 130. A plurality of air holes 33 for discharging carbon dioxide produced by the reformer 3 and the fuel cell section 4 are formed in a periphery of the terminal 14 and at the head top portion of the case 130. The electric power output from the terminal 14 may be directly supplied from the fuel cell section 4 and may be supplied via the electricity storage section 7.

A second drain pipe 17 is provided on the outer peripheral side of the case 130. This second drain pipe 17 protrudes downward from the bottom of the case 130, and is located at a position corresponding to a concave portion of the first drain pipe 16 of the fuel container 2. The second drain pipe 17 is a pipe for allowing by-product water produced by the fuel cell section 4 to be distributed, and the by-product water is discharged to the by-product take-in section 10 through the second drain pipe 17 and the first drain pipe 16.

The second drain pipe 17 is coupled to the by-product take-in section 10, and a water introduction pipe 136 provided in the case 130 leads to the second drain pipe 17 via the by-product take-in section 10. The by-product take-in section 10 functions as a pump which introduces the by-product water produced by the fuel cell section 4 to the reformer 3 as necessary, and supplies a proper amount of water intended for the reformer 3 to the water introduction pipe 136, and then discharges extra water to the by-product collecting section 109 of the fuel container 2 via the second drain pipe 17. This makes it possible to heighten the concentration of chemical fuel except for water contained in the fuel 19 within the fuel sealing section 108, and increase an amount of produced hydrogen per unit volume of the fuel.

An intake pipe 15 is provided to protrude downward at the bottom and center of the case 130. A micro flow path which penetrates from an edge of the intake pipe 15 along its central line and causes a capillary phenomenon is formed in the intake pipe 15, and has a function to send the fuel 19 supplied from the supply pipe 18 to the vaporization section 5. The intake pipe 15 is located at a position corresponding to the through-hole 105 of the fuel container 2, and opens the check valve 111 to suck in the fuel 19 from the fuel sealing section 108.

In the fuel container 2 and the power generation module 6 as described above, when the fuel container 2 storing the fuel sealing section 108 is attached to the power generation module 6, the second drain pipe 17 of the power generation module 6 is connected to the first drain pipe 16 of the fuel container 2 on an outer peripheral side of an area where the fuel container 2 and the power generation module 6 are connected. In this way, the second drain pipe 17 communicates with the first drain pipe 16, thereby making it possible to let the by-product water produced by the power generation module 6 flow from the second drain pipe 17 to the first drain pipe 16 to be discharged to the by-product take-in section 10.

Water as the by-product produced by the fuel cell section 4 is finally collected by the by-product collecting section 109 via the by-product take-in section 10, so that it does not flow outside the power generation system 1. Furthermore, while at least one of the vaporization section 5 and the aqueous shift reaction section 12 is operating as described above, at least part of water produced by the fuel cell section 4 can be controlled to be supplied to the operating compact reaction section.

At a central portion where the fuel container 2 and the power generation module 6 are connected, the intake pipe 15 of the power generation module 6 is inserted into the through-hole 105 of the fuel container 2 and the supply port 110 of the fuel sealing section 108, and pushes down the check valve 111 of the supply port 110 to open the check valve 111. In this way, the intake pipe 15 communicates with the supply pipe 18 of the fuel sealing section 108, and the fuel 19 stored in the fuel sealing section 108 can be supplied from the supply pipe 18 to the intake pipe 15.

Next, the reformer 3 built in the power generation module 6 will be described.

The reformer 3 comprises the vaporization section 5 for heating the fuel 19 supplied from the fuel sealing section 108 to evaporate the fuel 19; the hydrogen reforming section 11 for producing hydrogen gas from the fuel 19 vaporized by the vaporization section 5; the aqueous shift reaction section 12 for producing carbon dioxide and hydrogen gas from carbon monoxide gas and water contained in an air-fuel mixture supplied from the hydrogen reforming section 11 and lowering the concentration of carbon monoxide; and the selective oxidative reaction section 13 for oxidizing carbon monoxide gas, which is contained in the air-fuel mixture supplied from the aqueous shift reaction section 12 and can not be completely removed by the aqueous shift reaction section 12, to remove carbon monoxide gas. The vaporization section 5, the hydrogen reforming section 11, the aqueous shift reaction section 12 and the selective oxidative reaction section 13 are stacked in this order. The vaporization section 5, the hydrogen reforming section 11, the aqueous shift reaction section 12 and the selective oxidative reaction section 13 each have a chemical reactor called a micro reactor, and each cause a different chemical reaction.

The vaporization section 5, the hydrogen reforming section 11, the aqueous shift reaction section 12 and the selective oxidative reaction section 13 are each constituted by joining a micro substrate and an opposite substrate for sealing the micro substrate, and a fluid flows in a groove which is formed in at least one of those substrates, so as to cause a chemical reaction in at least part of the fluid.

Figure 3:
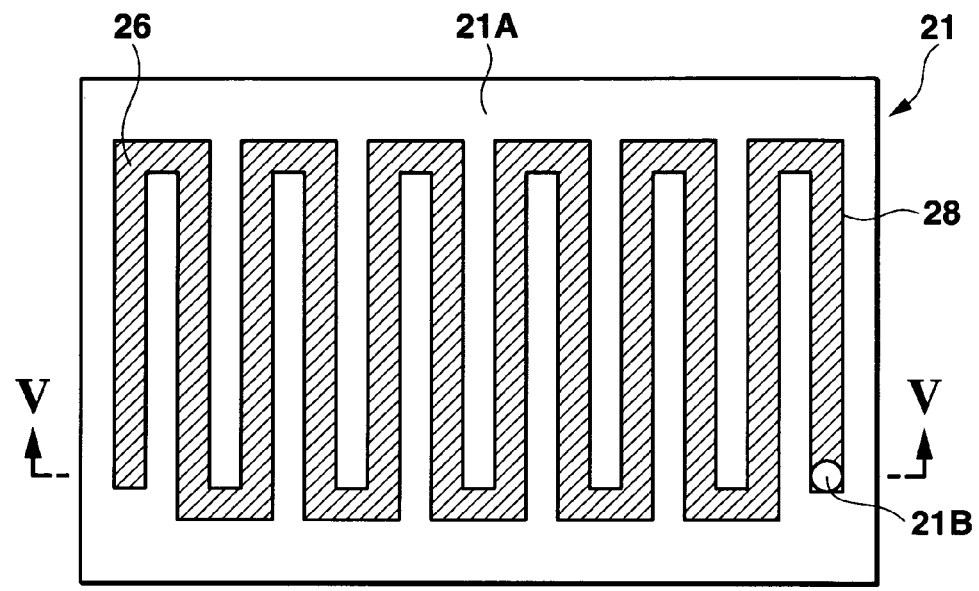
FIG. 3 is a transmitted plan view showing a first substrate according to the first embodiment.
Figure 4:
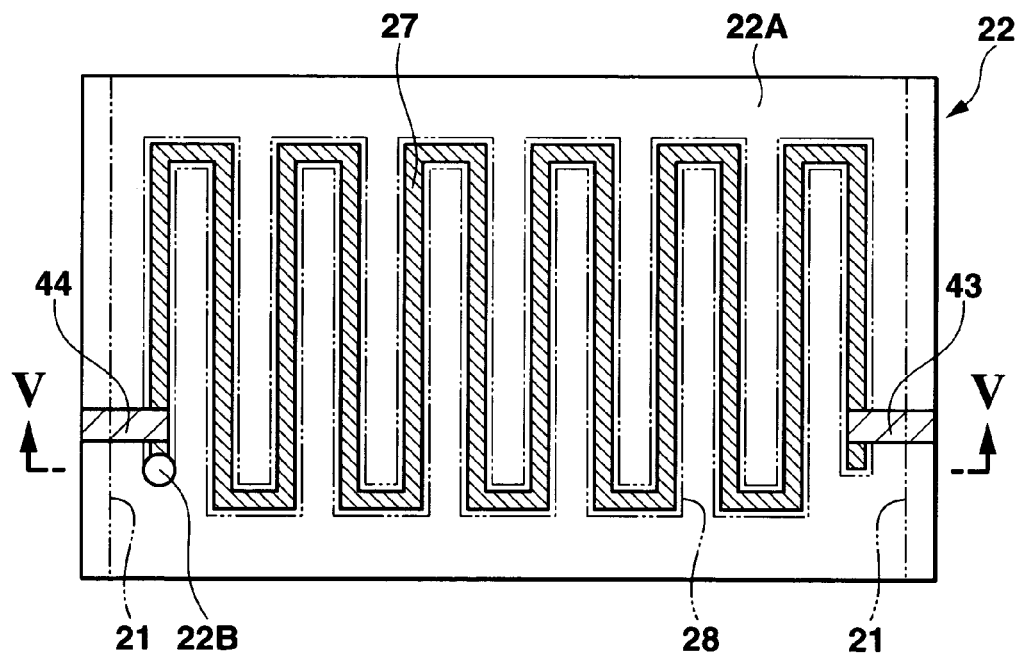
FIG. 4 is a transmitted plan view showing a second substrate according to the first embodiment.
Figure 5:
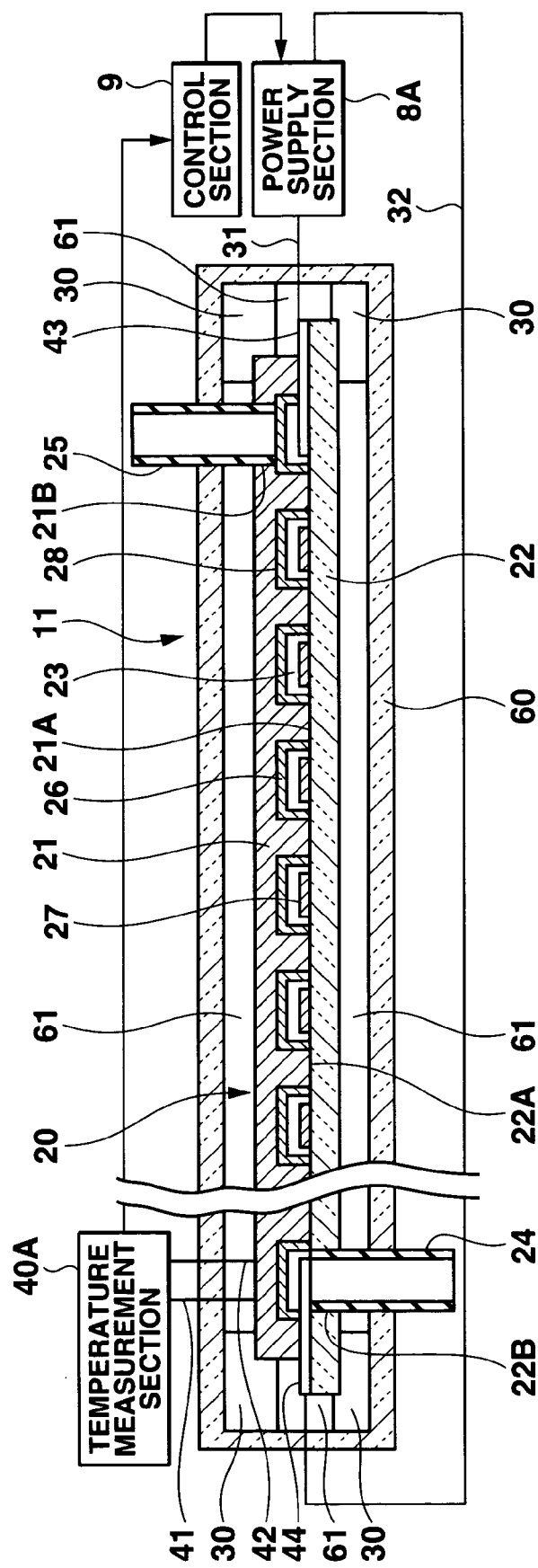
FIG. 5 is a schematic sectional view showing a hydrogen reforming section according to the first embodiment.

The hydrogen reforming section 11 will be described in detail below as one example of part of the reformer 3 according to the present invention as shown in FIG. 3, FIG. 4 and FIG. 5, but the hydrogen reforming section 11, the aqueous shift reaction section 12 and the selective oxidative reaction section 13 have the same basic configuration, so that the hydrogen reforming section 11 which will be described below has the same configuration as those of the aqueous shift reaction section 12 and the selective oxidative reaction section 13 except that the kinds of components and catalyst supplied from an inflow pipe 24 are different. In addition, the vaporization section 5 has the same configuration as that of the hydrogen reforming section 11 described below except for components supplied from the inflow pipe 24 and except that a reforming catalyst film 26 is provided.

FIG. 3 is a transmitted plan view of a first substrate 21 of the hydrogen reforming section 11 as one example. The first substrate 21 is a semiconductor or conductor substrate made of, for example, silicon or aluminum. A groove 28 having a predetermined depth is formed in a meandering shape in one surface 21A of the first substrate 21, and the reforming catalyst film 26 is attached on an inner surface of the groove 28. The reforming catalyst film 26 is formed by a predetermined catalyst material supported on a porous layer of aluminum oxide or the like. An opening 21B which opens to communicate with one end of the groove 28 is formed in a thickness direction of the first substrate 21. An outflow pipe 25 described later is coupled to the opening 21B.

FIG. 4 is a transmitted plan view of a second substrate 22 of the hydrogen reforming section 11 as one example. The second substrate 22 is an insulated substrate having heat resisting properties, and is made of materials such as pyrex glass, quartz glass, sapphire (single crystal of $Al_2O_3$) and alumina (sinter of $Al_2O_3$), and a rare earth oxide. On a surface 22A of the second substrate 22 joining to the first substrate 21, one oxide among $Y_2O_3$, $Gd_2O_3$, $Sm_2O_3$, $Er_2O_3$ and $Yb_2O_3$ is formed into a film. Hydrogen is contained in the oxides $Y_2O_3$, $Gd_2O_3$, $Sm_2O_3$, $Er_2O_3$ and $Yb_2O_3$, and the second substrate 22 containing the oxides has ionic conductivity by containing hydrogen. In addition, quartz glass does not easily expand thermally and distort little, and thus has an advantage that it is not easily broken even in an environment with severe temperature changes, which is required for the substrate of the reformer.

A thin film heater 27 is formed on the surface 22A of the second substrate 22 facing one surface 21A of the first substrate 21. The thin film heater 27 is made by forming an electric-resistance heating element or a semiconductor heating element into a thin film, and is formed along the groove 28. The thin film heater 27 has a width smaller than that of the groove 28 so as to be accommodated in the groove 28 when the first substrate 21 and the second substrate 22 are joined on the surface 21A and the surface 22A. An opening 22B which opens to communicate in a thickness direction of the second substrate 22 is formed at a position corresponding to the other end of the groove 28 in the first substrate 21. The inflow pipe 24 described later is coupled to the opening 22B. The thin film heater 27 has one end connected to a wire terminal 43 and the other end connected to a wire terminal 44. An end face of the second substrate 22 on a side provided with the wire terminal 43 and the wire terminal 44 protrudes from an end face of the first substrate 21 so that at least part of the wire terminal 43 and part of the wire terminal 44 are exposed in a state where the second substrate 22 overlaps the first substrate 21.

A space sealed by the groove 28 of the first substrate 21 and the surface 22A of the lower substrate 22 is a micro flow path 23, in a state where the first substrate 21 and the second substrate 22 are joined. As a result, the micro flow path 23 meanders in zigzags, and has both ends connected to the inflow pipe 24 and the outflow pipe 25.

FIG. 5 shows, in a sectional view of the line V-V of FIG. 3 and FIG. 4, the hydrogen reforming section 11 as one example. The hydrogen reforming section 11 comprises a micro reactor 20 which reforms the air-fuel mixture supplied from the vaporization section 5 into hydrogen gas with a reforming catalyst, and a heat-insulating package 60 for placing the micro reactor 20 under a depressurized environment of preferably 1 Pa or less than 1 Pa while completely accommodating the micro reactor 20. In addition, the vaporization section 5 is also configured substantially in the same way as the hydrogen reforming section 11, the aqueous shift reaction section 12 and the selective oxidative reaction section 13, except for the catalyst film 27.

The micro reactors 20 in the vaporization section 5, the hydrogen reforming section 11, the aqueous shift reaction section 12 and the selective oxidative reaction section 13 are each configured by the first substrate 21 and the second substrate 22 described above, and reform the fluid flowing in the micro flow path 23 while moving the fluid. The groove 28 formed in the first substrate 21 is formed by properly applying a photolithography method, an etching method or the like to one surface 21A of the first substrate 21. The first substrate 21 may be a semiconductor substrate formed of silicon, and in this case, the groove 28 may be formed by a sand blast method.

Figure 6:
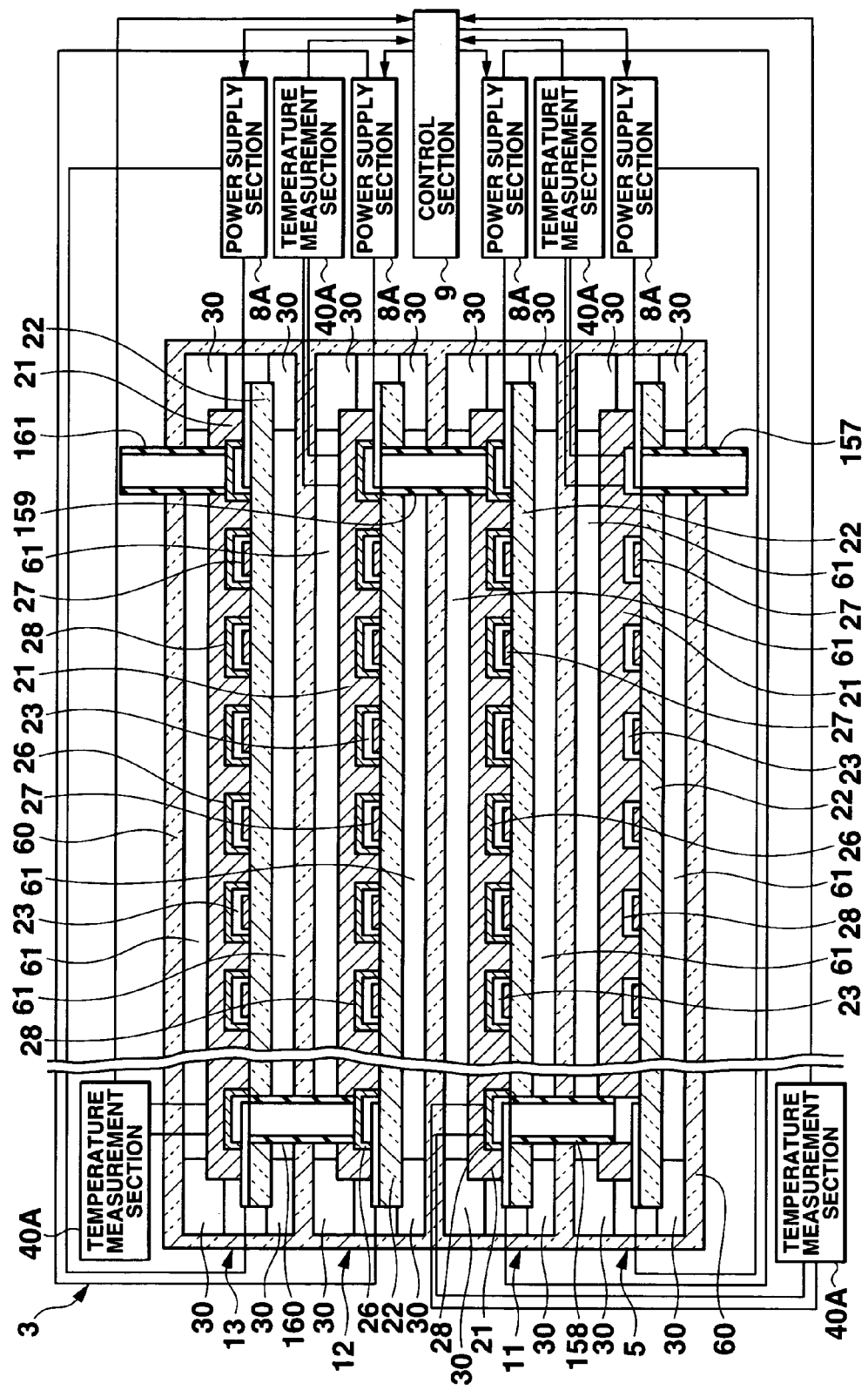
FIG. 6 is a schematic sectional view showing a reformer according to the first embodiment.

The vaporization section 5, the hydrogen reforming section 11, the aqueous shift reaction section 12 and the selective oxidative reaction section 13 are stacked in this order from the bottom as shown in FIG. 6, and the micro flow paths 23 provided inside the respective members are arranged to be coupled to each other via the inflow pipe 24 and the outflow pipe 25, between the members adjacent to each other.

The heat-insulating packages 60 of all the vaporization section 5, the hydrogen reforming section 11, the aqueous shift reaction section 12 and the selective oxidative reaction section 13 are constituted of an insulating material with low thermal conductivity formed by glass or the like having a thermal conductivity of 0 to 3 (W/m·K). A radiation reflecting film (not shown) formed of Au, Ag, Al or the like is formed on an inner surface of the heat-insulating package 60. The radiation reflecting film reflects electromagnetic waves containing infrared radiation at high reflectivity, and thus the radiation reflecting film reflects radiation heat emitted by the internal micro reactor 20 to hold the heat from being transferred outside the heat-insulating package 60. This makes it possible to prevent radiation heat from being released outside the heat-insulating package 60.

In all of the vaporization section 5, the hydrogen reforming section 11, the aqueous shift reaction section 12 and the selective oxidative reaction section 13, an internal space 61 inside the heat-insulating package 60 is set to the atmosphere under pressure lower than atmospheric pressure, of preferably equal to or lower than one Pa, or is charged with multi-halogenated derivative gas (freon (brand name) gas) containing fluorine which has a low thermal conductivity and is an inert gas or with carbon dioxide gas. Multi-halogenated derivative gas containing fluorine includes, for example, trichlorofluoromethane, dichlorodifluoromethane. Therefore, the structure makes it difficult for the heat of the thin film heater 27 to propagate to the heat-insulating package 60.

In all of the vaporization section 5, the hydrogen reforming section 11, the aqueous shift reaction section 12 and the selective oxidative reaction section 13, an insulating support 30 is provided at each internal corner on an internal surface of the heat-insulating package 60. The micro reactor 20 is disposed inside the heat-insulating package 60 in such a manner as to keep away from the internal surface of the heat-insulating package 60 while being supported by the insulating supports 30.

The micro reactors 20 in all the vaporization section 5, the hydrogen reforming section 11, the aqueous shift reaction section 12 and the selective oxidative reaction section 13 have a structure in which the first substrate 21 formed of a material such as silicon or aluminum having a high thermal conductivity and the second substrate 22 formed of a material such as glass with a low thermal conductivity are superposed on and joined to each other. A cross section of the groove 28 normal to a longitudinal direction of the micro flow path 23 is not limited to a rectangular shape but may be arch-shaped.

The power source section 8 has a plurality of power supply sections 8A each of which outputs electric power corresponding to a reaction temperature required in the micro reactor 20 to the thin film heater 27 via wires 31, 32 respectively connected to the wire terminals 43, 44. The thin film heater 27 is heated so that the micro flow path 23 and the reforming catalyst film 26 reach a temperature corresponding to the electric power from the power supply section 8A. The wires 31, 32 penetrate through in the heat-insulating package 60 without providing any clearance in between so as to maintain airtightness of the internal space 61 in the heat-insulating package 60.

A temperature measurement section 40A measures electric resistance of the first substrate 21 displaced by temperature from wires 41, 42 (FIG. 5), derives temperatures of the reforming catalyst film 26 and the micro flow path 23, and feeds this temperature information back to the control section 9. The control section 9 controls electric power supplied to the thin film heater 27 by the power supply section 8A on the basis of the temperature information from the temperature measurement section 40A so that the micro reactor 20 reaches a predetermined temperature. The wire 41, 42 penetrate through the heat-insulating package 60 without providing any clearance in between so as to maintain airtightness of the internal space 61 in the heat-insulating package 60.

As shown in FIG. 6, pipes 157, 158, 159, 160 and 161 each have a function as the inflow pipe 24 to let a fluid flow into the micro reactor 20, and a function as the outflow pipe 25 to let a fluid flow out. The first pipe 157 has one end coupled to the opening 22B of the second substrate 22 in the vaporization section 5 and the other end penetrating through the heat-insulating package 60 to be coupled to the intake pipe 15 via an unshown valve or pump. The fuel 19 stored in the fuel sealing section 108 is supplied to the micro flow path 23 of the vaporization section 5 through the intake pipe 15 and the pipe 157. A flow volume of the fuel 19 flowing into the flow path 23 of the vaporization section 5 can be adjusted by the valve or pump.

The second pipe 158 between the vaporization section 5 and the hydrogen reforming section 11 has one end coupled to the opening 21B of the first substrate 21 in the vaporization section 5 and the other end coupled to the opening 22B of the second substrate 22 in the hydrogen reforming section 11, thereby connecting the micro flow path 23 of the vaporization section 5 and the micro flow path 23 of the hydrogen reforming section 11.

The third pipe 159 between the hydrogen reforming section 11 and the aqueous shift reaction section 12 has one end coupled to the outflow pipe 25 of the first substrate 21 in the hydrogen reforming section 11 and the other end coupled to the opening 22B of the second substrate 22 in the aqueous shift reaction section 12, thereby connecting the micro flow path 23 of the hydrogen reforming section 11 and the micro flow path 23 of the aqueous shift reaction section 12.

The fourth pipe 160 between the aqueous shift reaction section 12 and the selective oxidative reaction section 13 has one end coupled to the opening 21B of the first substrate 21 in the aqueous shift reaction section 12 and the other end coupled to the opening 22B of the second substrate 22 in the selective oxidative reaction section 13, thereby connecting the micro flow path 23 of the aqueous shift reaction section 12 and the micro flow path 23 of the selective oxidative reaction section 13.

The fifth pipe 161 whose one end is coupled to the first substrate 21 in the selective oxidative reaction section 13 has the other end penetrating through the heat-insulating package 60 thereof to be coupled to the fuel cell section 4 via an unshown valve or pump. A flow volume of hydrogen supplied to the fuel cell section 4 can be adjusted by the valve or pump.

When the fuel 19 from the fuel container 2 is supplied into the micro flow path 23 via the opening 22B, the vaporization section 5 vaporizes the fuel 19 within the space in the micro flow path 23 heated together with the second substrate 22 by the heat (about 120° C.) generated by the thin film heater 27, and allows the vaporized fuel gas for power generation (e.g., $CH_3OH+H_2O$ when the fuel for power generation is a methanol aqueous solution) to flow out from the opening 21B.

Each of the micro reactors 20 in all the hydrogen reforming section 11, the aqueous shift reaction section 12 and the selective oxidative reaction section 13 is provided with the reforming catalyst film 26 made of a metal, metal oxide or the like on an inner wall surface of the micro flow path 23. In the hydrogen reforming section 11, the aqueous shift reaction section 12 and the selective oxidative reaction section 13, the reforming catalyst film 26 may be formed of the same material or may be formed of a different material. In any of the hydrogen reforming section 11, the aqueous shift reaction section 12 and the selective oxidative reaction section 13, the reforming catalyst film 26 of one reactor may be formed of one kind of material or may be formed of plural kinds of materials so that the material is different depending on a place in the micro flow path 23.

The reforming catalyst film 26 of the hydrogen reforming section 11 is constituted of a material containing a reformed catalyst made of Cu, ZnO, $Al_2O_3$, for example, and reacts methanol which is a fluid evaporated by the vaporization section 5 with water to promote the production of carbon dioxide and water, as in the following chemical equation (1).

$$CH_3OH + H_2O \rightarrow 3H_2 + CO_2 \tag{1}$$

The reforming catalyst film 26 of the aqueous shift reaction section 12 reacts carbon monoxide produced in a significantly small amount by the hydrogen reforming section 11 with water to promote the production of carbon dioxide and hydrogen, as in the following chemical equation (2).

$$CO + H_2O \rightarrow CO_2 + H_2 \tag{2}$$

The reforming catalyst film 26 of the selective oxidative reaction section 13 is made of Pt, $Al_2O_3$, for example, and reacts remaining carbon monoxide which has not completely reacted in the aqueous shift reaction section 12 with oxygen to promote the production of carbon dioxide, as in the following chemical equation (3).

$$2CO + O_2 \rightarrow 2CO_2 \tag{3}$$

In the present embodiment, the inner surface of the micro flow path 23 of the vaporization section 5 is not provided with the catalyst layer, but the catalyst layer which promotes the reaction in the chemical equation (1) may be provided on the inner surface of the micro flow path 23 of the vaporization section 5.

When the vaporized fuel 19 supplied from the vaporization section 5 is supplied into the micro flow path 23 via the opening 22B, the hydrogen reforming section 11 causes the reaction as in the chemical equation (1) due to the heat (about 280° C.) generated by the thin film heater 27, thus producing hydrogen, by-product carbon dioxide, and in some cases a significantly small amount of carbon monoxide. Then, a produced fluid such as hydrogen flows out from the opening 21B.

Water ($H_2O$) on the left side of the above equation (1) may be water contained in the fuel 19 of the fuel container 2 at an initial stage of the reaction, but the by-product take-in section 10 may collect water produced by power generation of the fuel cell section 4 described later to supply the water to the hydrogen reforming section 11. In addition, a supply source of water ($H_2O$) on the left side of the above equation (1) may be only the fuel cell section 4, may be the fuel cell section 4 and the fuel container 2, and may be only the fuel container 2.

Carbon monoxide which is the by-product in the fluid flowing from the opening 21B of the hydrogen reforming section 11 to the opening 22B of the aqueous shift reaction section 12 reacts with water in the space within the micro flow path 23 of the aqueous shift reaction section 12 to produce hydrogen due to the heat generation of the thin film heater 27. Thus, a fluid containing a higher concentration of hydrogen flows out from the opening 21B in the aqueous shift reaction section 12.

Carbon monoxide which remains in the fluid flowing from the opening 21B of the aqueous shift reaction section 12 to the opening 22B of the selective oxidative reaction section 13 reacts with oxygen in the space within the micro flow path 23 of the selective oxidative reaction section 13 to become carbon dioxide due to the heat generation (about 180° C.) of the thin film heater 27. Then, a fluid containing hydrogen and carbon dioxide flows out from the opening 21B in the selective oxidative reaction section 13.

In this way, the hydrogen reforming section 11 reforms the fuel 19 into hydrogen to be supplied to the fuel cell section 4, and the aqueous shift reaction section 12 and the selective oxidative reaction section 13 remove and detoxify carbon monoxide which is a toxic by-product produced by the hydrogen reforming section 11.

The fluid after a series of reactions described above contains hydrogen and carbon dioxide, and out of these products, carbon dioxide is released outside from the air holes 33. The aqueous shift reaction section 12 or the selective oxidative reaction section 13 may be provided between the vaporization section 5 and the hydrogen reforming section 11.

Figure 7:
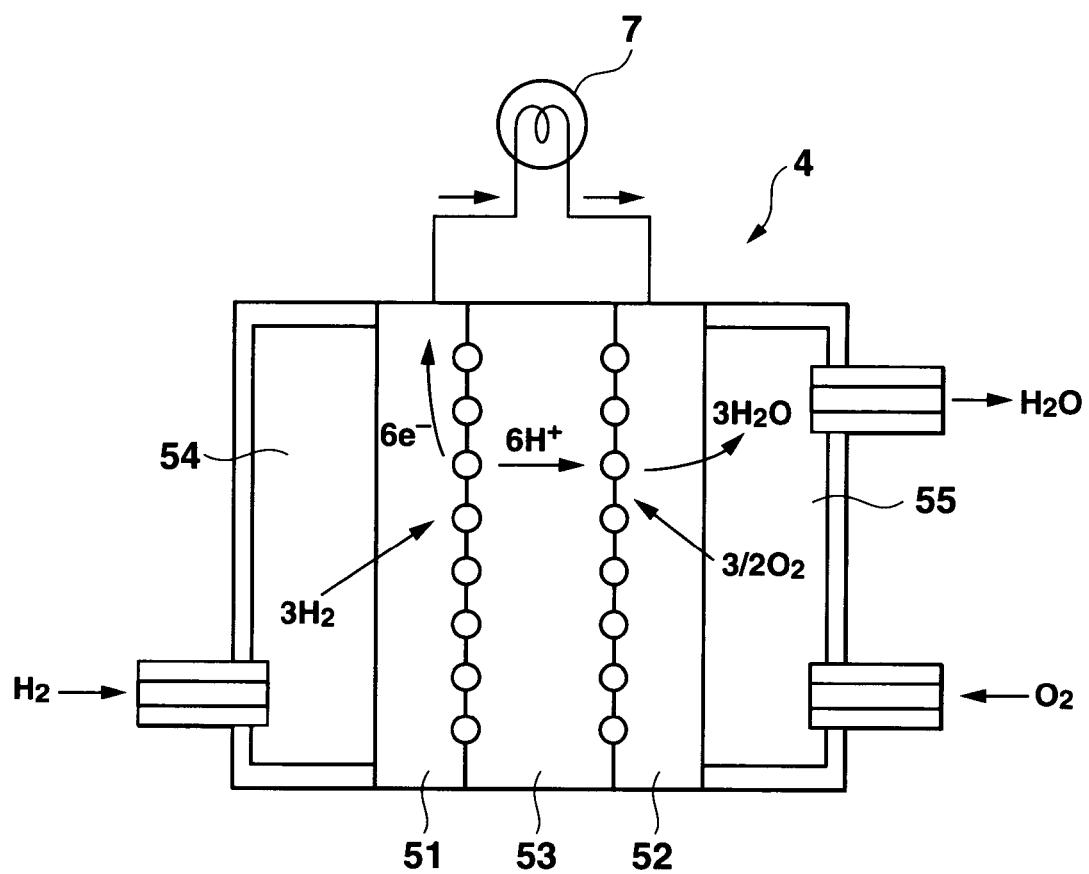
FIG. 7 is a schematic configuration view showing a fuel cell section according to the first embodiment.

Next, the fuel cell section 4 is constituted of a known solid macromolecule type fuel cell as shown in FIG. 7. More specifically, the fuel cell section 4 is constituted by having a cathode (fuel electrode) 51 made of a carbon electrode supporting catalysts such as Pt and C; an anode (air electrode) 52 made of a carbon electrode supporting catalysts such as Pt, Ru and C; and a film-like ion conductive film 53 placed between the cathode 51 and anode 52, thereby supplying electric power to the electricity storage section 7 constituted of a secondary cell or a capacitor provided between the cathode 51 and anode 52.

In this case, a space section 54 is provided outside the cathode 51. Hydrogen from the selective oxidative reaction section 13 is supplied into the space section 54, and thus hydrogen is supplied to the cathode 51. A space section 55 is provided outside the anode 52. Oxygen taken in from the atmosphere via the check valve is supplied into the space section 55, and thus oxygen is supplied to the anode 52.

Hydrogen ions (proton; $H^+$) in which electrons ($e^-$) are separated from hydrogen are produced on a side of the cathode 51 as shown in the following equation (4), and pass to a side of the anode 52 via the ion conductive film 53, and then the cathode 51 takes out electrons ($e^-$) therefrom to supply them to the electricity storage section 7.

$$3H_2 \rightarrow 6H^+ + 6e^- \quad (4)$$

Electrons ($e^-$) supplied by way of the electricity storage section 7, hydrogen ions ($H^+$) passed through the ion conductive film 53 and oxygen react on the side of the anode 52, thereby producing by-product water, as shown in the following equation (5).

$$6H^+ + (3/2)O_2 + 6e^- \rightarrow 3H_2O \quad (5)$$

The series of electrochemical reactions described above (equation (4) and equation (5)) proceed under an environment at a relatively low temperature of about room temperature to about 80° C., and water is basically the only by-product except for electric power. The electric power generated by the fuel cell section 4 is supplied to the electricity storage section 7, whereby the electricity storage section 7 is charged and the electricity storage section 7 properly supplies electricity to an external device via the terminal 14.

Here, a sealing method of the hydrogen reforming section 11 will be described as one example of a sealing method of the micro reactor 20. After first disposing in a chamber (not shown) the micro reactor 20 and the heat-insulating package 60 whose entrance for letting in the micro reactor 20 is open, the atmosphere in the chamber is depressurized by actuating suction means (not shown, e.g., a decompression pump) for sucking in the air which is connected to the inside of the chamber. At the same time, the pressure in the micro flow path 23 is equalized to the pressure in the chamber via the inflow pipe 24 and the outflow pipe 25. Continuously in this sate, water or the like in the chamber is volatilized by heating with a heater provided in the chamber, and water or the like in the micro flow path 23 is volatilized at the same time. After the micro reactor 20 and the heat-insulating package 60 in the chamber are adequately dried, the micro reactor 20 is inserted from the entrance of the heat-insulating package 60, and the micro reactor 20 is supported by the supports 30 in the heat-insulating package 60, and then the entrance of the heat-insulating package 60 is sealed.

Next, when the micro reactors 20 of the vaporization section 5, the hydrogen reforming section 11, the aqueous shift reaction section 12 and the selective oxidative reaction section 13 are individually inserted in the heat-insulating packages 60 as shown in FIG. 5, the inflow pipe 24 and the outflow pipe 25 are sealed, so that outside air does not come into the inflow pipe 24 and the outflow pipe 25. When the micro reactors 20 of the vaporization section 5, the hydrogen reforming section 11, the aqueous shift reaction section 12 and the selective oxidative reaction section 13 are collectively formed as shown in FIG. 6, the inflow pipe 24 and the outflow pipe 25 are sealed, so that outside air does not come into the micro flow path 23 of the micro reactor 20 from the inflow pipe 24 and the outflow pipe 25. The pipe 157 and the pipe 161 are sealed, so that outside air does not come into the micro flow path 23 of the micro reactor 20 from the pipe 157 and the pipe 161. Through such processes, the inside of the internal space 61 and of the micro flow path 23 is kept dry and in the depressurized atmosphere.

The inside of the chamber is dried after being placed in the depressurized atmosphere in the first embodiment, but may be placed in the depressurized atmosphere after dried, and may be depressurized and dried at the same time. In addition, the inside of the internal space 61 and of the micro flow path 23 is dried by heating with the heater in the chamber, but electric power may be supplied to the thin film heater 27 from the power source section 8 or an external power source via the wires 31 and 32 so that the thin film heater 27 generates heat to dry the inside of the internal space 61 and of the micro flow path 23. After it is dried, the inside of the chamber is separately depressurized and dried, and then the hydrogen reforming section 11 is sealed by the heat-insulating package 60, thereby enabling the inside of the internal space 61 and of the micro flow path 23 to be depressurized and dried. At the same time, an amount of electric power supplied from the power source section 8 should preferably be set so that the thin film heater 27 generates heat at higher temperature than when the hydrogen reforming section 11 is actually driven.

For example, in the case where the heat generation temperature of the thin film heater 27 is controlled so that it becomes 300° C. when the hydrogen reforming section 11 is driven, the thin film heater 27 is made to generate heat for ten minutes in a state where the heat generation temperature thereof for depressurizing the inside of the heat-insulating package 60 is controlled at 350° C. to 400° C. The heat generation temperature of the thin film heater 27 when depressurizing the inside of the heat-insulating package 60 can be properly changed, and is set in consideration of the heat generation temperature of the thin film heater 27 when driving the hydrogen reforming section 11, as well as heat resisting properties, capacity and superficial areas of various kinds of members that constitute the hydrogen reforming section 11. Further, the vaporization section 5 should preferably be heated to 150° C. to 200° C. since the temperature in the micro reactor 20 is about 120° C., and the aqueous shift reaction section 12 and the selective oxidative reaction section 13 should preferably be heated to 220° C. to 280° C. since the temperature in the micro reactor 20 is about 180° C. Attention is required because the reforming catalyst film 26 deteriorates due to high temperature if they are heated to an excessive temperature.

As to the heat generation temperature of the thin film heater 27 when depressurizing the inside of the heat-insulating package 60, if it is set much higher than the heat generation temperature for driving the hydrogen reforming section 11, the thin film heater 27 may only generate heat for a short time, but if it is set equal to or slightly higher than the heat generation temperature for driving the hydrogen reforming section 11, the thin film heater 27 should preferably generate heat for as long time as possible.

Next, a method for manufacturing the reformer 3 according to the present invention, particularly a method for manufacturing the micro reactor 20, and more particularly, a method for forming a heat generation resistive element made of an oxide as the thin film heater 27 on the second substrate 22 will be described.

First, (i) Y, Gd, Sm, Er or Yb is formed into a film on the second substrate 22 made of glass such as pyrex or quartz by sputtering, a reduced-pressure deposition method or the like in a thickness of A° 1000 to 3000. After that, (ii) the second substrate 22 including the formed film is heated (e.g., 400° C.) in a low-oxygen atmosphere containing hydrogen. A formed film obtained by this process is yttrium hydride, gadolinium hydride, samarium hydride, erbium hydride or ytterbium hydride. In each hydride, valence of yttrium, gadolinium, samarium, erbium or ytterbium may be bivalent or trivalent. After that, (iii) the second substrate 22 including the formed film which has undergone the process of (ii) is heated in the reduced pressure, of preferably equal to or lower than one Pa, so that unnecessary hydrogen in the formed film is taken out. In this process, the formed film including hydrogen changes to an oxidized formed film at a temperature below 700° C., a considerable amount of hydrogen remains in the oxidized formed film, and this hydrogen becomes an element that provides ionic conductivity.

An oxidized film of $SiO_2$ containing hydrogen may be formed on the quartz glass substrate as the second substrate 22, but $Y_2O_3$, $Gd_2O_3$, $Sm_2O_3$, $Er_2O_3$ or $Yb_2O_3$ is formed into a film on the second substrate 22 for the following reasons.

A first reason is that the quartz glass substrate in this case also contains hydrogen in this oxidized film and thus has ionic conductivity and is appropriate for anode joining, but the quartz glass is inferior by itself in workability because the second substrate 22 needs to be provided with openings and has cleavage properties.

A second reason is that melting points of those oxides are higher than the melting point of $SiO_2$. While the melting point of $SiO_2$ is about 1800° C., the melting point of $Y_2O_3$ is about 2415° C., and the melting point of $Gd_2O_3$ is about 2340° C., for example. In other words, if $Y_2O_3$, $Gd_2O_3$ and the like are formed into a film on the second substrate 22, the micro reactor 20 can be actuated under a high-temperature environment as compared with the case where $SiO_2$ is formed into a film.

A third reason is that CVD (Chemical Vapor Deposition) needs to be carried out when Si is formed into a film on the second substrate 22 in the above process (i), and a CVD apparatus must be used which is more expensive than a sputtering apparatus or the like and difficult to handle. In short, by forming Y, Gd, Sm, Er or Yb into a film instead of Si in the above process (i), it is possible to avoid using the CVD apparatus.

As described above, it is also possible to form Si into a film on the second substrate 22 by sputtering, but time needed for sputtering Si is several times as short as the time needed for sputtering Y, for example, and thus processing efficiency in sputtering Si is not good. This is one of the above reasons.

Furthermore, the film formation methods comprising (i) to (iii) above can be applied to Y and all of lanthanoid, but Y, Gd, Sm, Er or Yb should preferably be applied as an element to be formed into a film on the second substrate 22 for the following reasons. In other words, La, Ce, Pr, Nd, Eu and Tb are not preferable because those are difficult to handle and extremely easy to oxidize. Ce, Pr, and Tb are not preferable because they tend to take a stoichiometric composition other than $R_2O_3$ (R is an element), and can have carrier conductivity as a property other than ionic conductivity. Dy and Ho are not preferable because they are the same as Ce, Pr, and Tb and oxides are not colorless (i.e., colored). Tm and Lu can be applied in principle, but are expensive and has no practical use.

From the above reasons, one oxide out of $Y_2O_3$, $Gd_2O_3$, $Sm_2O_3$, $Er_2O_3$ and $Yb_2O_3$ containing hydrogen is formed into a film on a predetermined surface of the second substrate 22, and the first substrate 21 and the second substrate 22 are anode-joined to each other in a state where the surface of the second substrate 22 on which one of the above oxides is formed into a film is opposed to a surface of the first substrate 21 in which a groove is formed.

Next, an operation of the power generation system 1 will be described.

First, when the control section 9 outputs an ON signal to the power source section 8, electric power is supplied from the power supply section 8A of the power source section 8 to the thin film heaters 27 in the vaporization section 5, the hydrogen reforming section 11, the aqueous shift reaction section 12 and the selective oxidative reaction section 13, and the thin film heaters 27 generate heat. The temperature measurement section 40 (or the temperature measurement section 40A) feeds back to the control section 9 the temperature information obtained through the wires 41 and 42 in each of the vaporization section 5, the hydrogen reforming section 11, the aqueous shift reaction section 12 and the selective oxidative reaction section 13, and the control section 9 outputs a control signal to the power source section 8 so that the vaporization section 5, the hydrogen reforming section 11, the aqueous shift reaction section 12 and the selective oxidative reaction section 13 reach their appropriate temperatures. The temperature information includes a voltage to be applied to the thin film heater 27 and a current to flow through the thin film heaters 27, but may include only the current if the voltage of the power supply section 8A in the power source section 8 is constant and may include only the voltage if the current of the power source section 8 is constant.

On the other hand, when the fuel 19 is supplied from the fuel container 2 to the vaporization section 5, the fuel 19 vaporizes in the vaporization section 5, and air pressure in the vaporization section 5 is heightened to cause convection. In this way, an air-fuel mixture of methanol and water flows from the vaporization section 5 into the hydrogen reforming section 11 of the micro reactor 20.

In the hydrogen reforming section 11, the air-fuel mixture flows into the outflow pipe 25 from the inflow pipe 24 through the micro flow path 23. The fluid similarly flowing from the outflow pipe 25 of the hydrogen reforming section 11 enters the inflow pipe 24 of the aqueous shift reaction section 12, runs through the micro flow path 23 to enter the inflow pipe 24 of the selective oxidative reaction section 13 by way of the outflow pipe 25, and then runs through the micro flow path 23 to be finally discharged from the outflow pipe 25 of the selective oxidative reaction section 13. When the air-fuel mixture is flowing through the micro flow path 23, each of the thin film heaters 27 generates heat at a predetermined temperature in accordance with the amount of electric power supplied from the power source section 8, so that the air-fuel mixture is heated. When the thin film heater 27 generates heat, the temperature in each of the heat-insulating package 60 of the micro reactor 20 increases.

Figure 8:
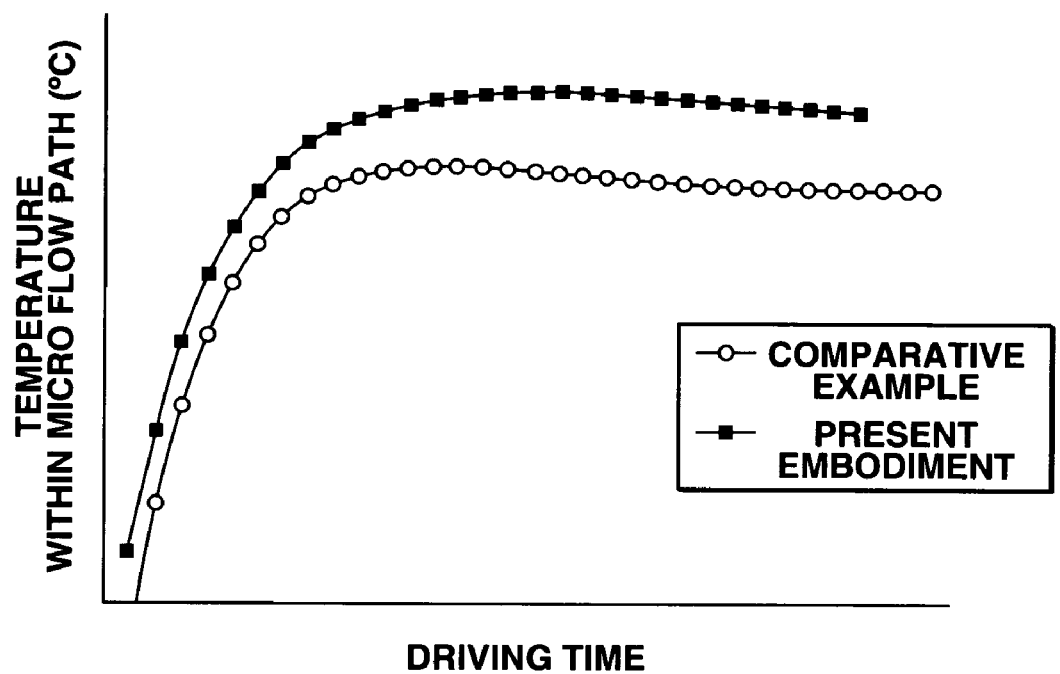
FIG. 8 is a graph showing a relationship between driving time of a micro reactor and temperature in a micro flow path.

FIG. 8 shows a relationship between driving time of the reformers and the temperature in the micro reactors 20 of the reformers, in connection with the reformer in the present first embodiment, and a reformer as a comparative example in which the micro reactor 20 is inserted in the heat-insulating package 60 under the atmosphere without deaerating the chamber and without heating the inside of the chamber and outside air is present in the internal space 61 of the heat-insulating package 60. The electric power supplied to the thin film heater 27 is the same in both the reformers. As shown in FIG. 8, the temperature in the micro reactor 20 according to the present first embodiment is always higher than that of the comparative example at the same time even if the same electric power is supplied. This indicates that quantity of heat that flows away outside the micro reactor 20 is smaller in the present first embodiment than in the conventional case.

In the internal space 61 of the heat-insulating package 60 of the comparative example, heating of the thin film heater 27 increases the temperature, so that a gas and water sealed at atmospheric pressure expand. The fluid which has expanded in the internal space 61 causes convection between the vicinity of the thin film heater 27 where the temperature is high and the heat-insulating package 60 where the temperature is low. At this point, the fluid itself serves as a medium that absorbs the heat of the thin film heater 27 and is cooled down by contacting the heat-insulating package 60 having a lower temperature, and the heat-insulating package 60 which has absorbed the heat from the fluid radiates the heat outside. The fluid once cooled down by contacting the heat-insulating package 60 causes convection with a fluid that has been newly heated, thereby repeating the above flow. Therefore, the heat of the thin film heater 27 largely propagates outside the heat-insulating package 60, thus causing heat loss.

Contrarily, in the reformer of the first embodiment, an amount of gas serving as the heat medium in the internal space 61 is small because the micro reactor 20 is accommodated in the heat-insulating package 60 under a depressurized and heated atmosphere, so that the convection is not easily caused, and heat quantity radiated outside from the heat-insulating package 60 is small, and therefore the temperature of the micro reactor 20 tends to be high.

Furthermore, in the hydrogen reforming section 11, a chemical reaction in accordance with the chemical equation (1) is promoted in the air-fuel mixture by the reforming catalyst film 26 at the same time when the thin film heater 27 generates heat. In addition, the reaction in the chemical equation (1) is an endoergic reaction, so that the air-fuel mixture is heated by the thin film heater 27 to increase its reaction rate. A starting time required for power generation can thus be shortened.

In the aqueous shift reaction section 12, a chemical reaction in accordance with the chemical equation (2) is promoted in the air-fuel mixture by the reforming catalyst film 26 at the same time when the thin film heater 27 generates heat. Heat is required during the reaction in the chemical equation (2), so that the air-fuel mixture is heated by the thin film heater 27 to increase its reaction rate. The starting time required for power generation can thus be shortened.

In the selective oxidative reaction section 13, a chemical reaction in accordance with the chemical equation (3) is promoted in the air-fuel mixture by the reforming catalyst film 26 at the same time when the thin film heater 27 generates heat. Heat is required during the reaction in the chemical equation (3), so that the air-fuel mixture is heated by the thin film heater 27 to increase its reaction rate. The starting time required for power generation can thus be shortened.

From hydrogen gas and carbon dioxide gas produced by the micro reactor 20, hydrogen gas is supplied to the fuel cell section 4, and carbon dioxide gas is released outside the power generation module 6. Chemical reactions in accordance with the chemical equations (4) and (5) are caused in the fuel cell section 4, and electric energy is generated. After that, while the air-fuel mixture is being supplied from the fuel container 2 to the reformer 3, the above operation is repeated so that the fuel cell section 4 sequentially generates electric energy.

As described above, in the present first embodiment, at least one oxide out of $Y_2O_3$, $Gd_2O_3$, $Sm_2O_3$, $Er_2O_3$ and $Yb_2O_3$ containing hydrogen is formed into a film on the second substrate 22 in the micro reactor 20 to anode-join the first substrate 21 and the second substrate 22, and therefore the micro reactor 20 can be actuated under a high-temperature environment as compared with the case where the conventionally used glass substrate and quartz glass substrate on which the oxidized film (Si) is formed are applied as the second substrate 22.

In the present first embodiment, before the micro reactors 20 in the vaporization section 5, the hydrogen reforming section 11, the aqueous shift reaction section 12 and the selective oxidative reaction section 13 are actually operated, the thin film heater 27 is, for example, made to previously generate heat at the temperature higher than the heat generation temperature for actually driving the micro reactor 20 so as to seal the heat-insulating package 60 by depressurizing the inside thereof, and thus components (e.g., water) adsorbed by an inner wall of the heat-insulating package 60, a periphery of the micro reactor 20 or the like have already vaporized when the micro reactor 20 is actually operated, thereby making it possible to reduce the medium which conducts the heat in the heat-insulating package 60. In this way, the heat flowing out due to the convection in the heat-insulating package 60 can be restricted, and moreover the micro reactor 20 can be actuated under a high-temperature environment in a state where the electric power supplied to the thin film heater 27 is reduced.

Second Embodiment

Figure 9:
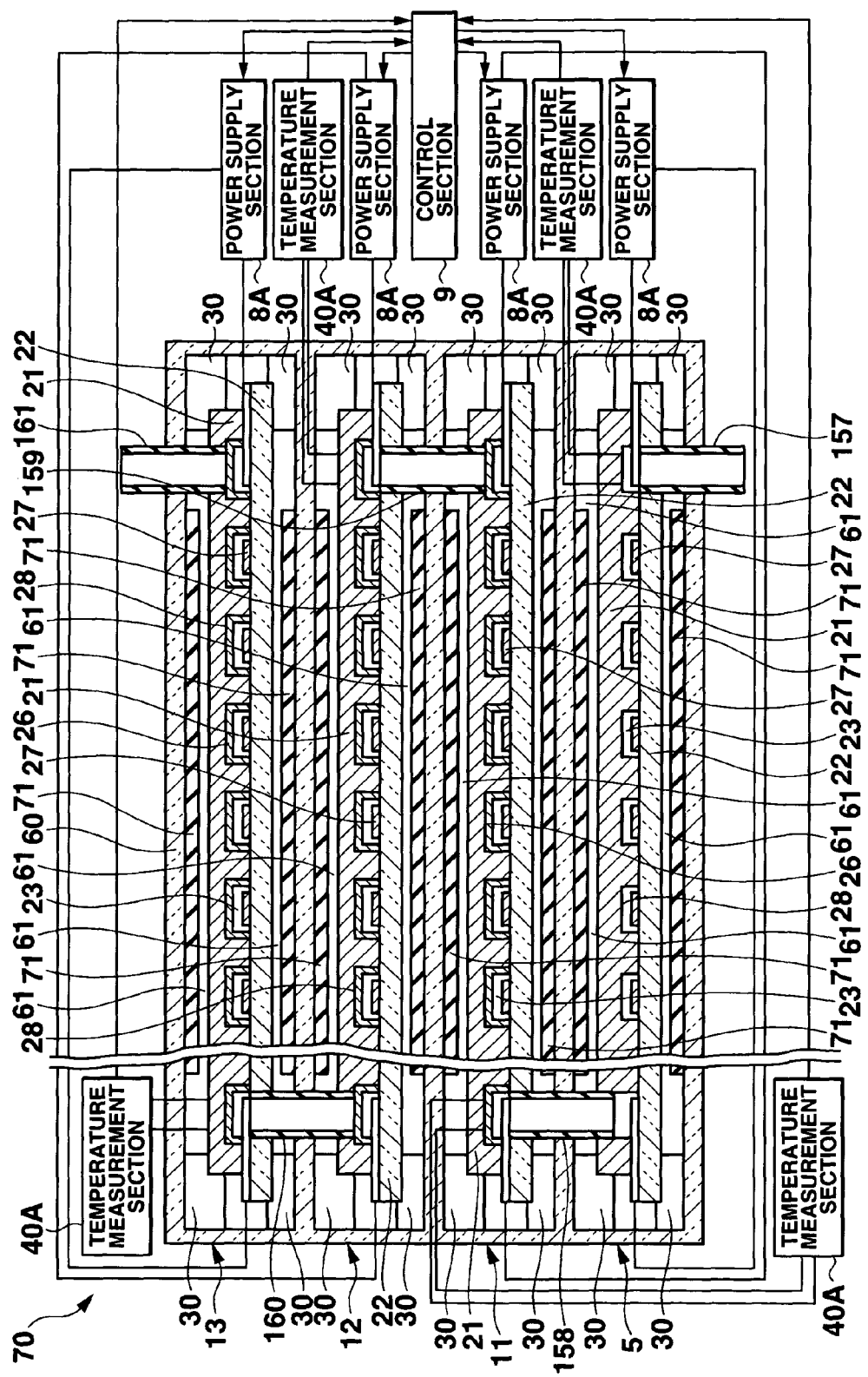
FIG. 9 is a schematic sectional view showing a reformer according to a second embodiment.

The fuel cell system of a second embodiment comprises about the same configuration as that of the power generation system 1 of the first embodiment described above, and part of the reformer is differently configured. Therefore, only the reformer will be described in the power generation system of the second embodiment. FIG. 9 is a schematic sectional view showing a reformer 70 according to the second embodiment. In the reformer 70 shown in FIG. 9, the same reference numbers are given to the same members as those in FIG. 2 described in the above first embodiment, and those members will not be described in detail.

In this reformer 70, adsorption component supports 71 are provided on the inner walls of the heat-insulating packages 60. The adsorption component supports 71 adsorb components such as water existing on the inner walls of the heat-insulating packages 60 and the periphery of the micro reactors 20, (wherein each micro reactor 20 in FIG. 9 includes a first substrate 21, a second substrate 22, and a flow path 23). In the adsorption component supports 71 an adsorption material such as yttrium that adsorbs materials to be adsorbed such as water is supported by a film having a large superficial area, for example, a polyimide foam made of porous polyimide or activated carbon. The polyimide foam has excellent heat resisting properties derived from polyimide, and its superficial area is large because it has a foaming structure. In the adsorption material, while one of physical adsorption and chemical adsorption can be applied, an irreversible reaction is preferable in the case of the chemical adsorption. Thus, even if the adsorption component supports 71 are not provided in all parts of the internal space 61 in the heat-insulating package 60, components to be adsorbed can be sufficiently adsorbed when the adsorption component supports 71 are provided at one position or a plurality of positions in the heat-insulating package 60 with relatively small capacity.

As to adsorption components supported by the adsorption component support 71, desired adsorption components are supported by the polyimide foam in accordance with a set temperature at which each thin film heater 27 generates heat when actuating the reformer 70, a depressurizing degree when the inside of the heat-insulating package 60 is depressurized, and capacity of the internal space 61 placed under the depressurized environment.

In the reformer 70, the internal space 61 is placed in the depressurized environment similarly to the hydrogen reforming section 11 shown in FIG. 5, and the internal space 61 is preferably depressurized by heating of the thin film heater 27 and by heating the inside of the chamber, but it is difficult to completely remove the components such as water from the inner wall of the heat-insulating package 60, the periphery of the micro reactor 20 and the like.

Next, functions of the reformer 70 will be described. When electric power is supplied to the thin film heaters 27 during the operation of the reformer 70, the thin film heaters 27 generate heat, and the temperature inside the heat-insulating packages 60 rapidly increases. If the temperature inside the heat-insulating packages 60 exceeds a predetermined temperature, the components such as water remaining on the inner wall of the heat-insulating package 60 and the periphery of the micro reactor 20 vaporize. The vaporized components are adsorbed by the adsorption component supports 71.

As described above, in the present second embodiment, the components remaining in the heat-insulating packages 60 vaporize and thus the depressurizing degree inside the heat-insulating packages 60 can be lowered temporarily during the actual operation of the reformer 70, but the adsorption component supports 71 adsorb the vaporized components, thereby making it possible to inhibit the depressurizing degree inside the heat-insulating packages 60 from lowering. In this way, the heat flowing out due to the convection in the heat-insulating packages 60 can be restricted, and moreover the micro reactor 20 can be actuated under a high-temperature environment in a state where the electric power supplied to the thin film heater 27 is reduced.

The present invention is not limited to the embodiments described above, and various improvements and design changes may be aimed without departing from the spirit of the present invention.

For example, the air-fuel mixture which is heat-treated and reacted by the micro reactor 20 includes methanol and water vapor, but may be an air-fuel mixture of alcohols other than methanol and water vapor, and dimethyl ether may also be applied. However, the kind of the reforming catalyst film 26 should desirably be changed depending on the kind of air-fuel mixture.

Furthermore, the internal space formed in the micro reactor 20 is the elongate micro flow path 23, but may be simply a hollow chamber.

Still further, the thin film heater 27 is provided in the micro reactor 20, but instead of or in addition to this configuration, a heating element or elements may be provided outside the micro reactor 20. In this case, the heating element should preferably be provided in a state cohering to an outer wall of the micro reactor 20 so that heat is easily conducted to the micro flow path 23 in the micro reactor 20.

The thin film heater 27 generates heat when the inside of the internal space 61 is placed in the depressurized environment in the second embodiment similarly to the first embodiment, but pressure may be reduced inside the heat-insulating package 60 without making the thin film heater 27 generate heat to insert the micro reactor 20 in the heat-insulating package 60.

The micro reactor 20 is heated by the thin film heater 27 which generates heat with an applied voltage in the embodiments described above, but a combustor which generates heat by burning the fuel from the fuel container 2 may be used, or both the thin film heater 27 and the combustor may be used.

The groove is provided only in the first substrate 21 in the embodiments described above, but the grooves may also be provided in such a manner as to overlap each other both in the first substrate 21 and the second substrate 22. In this case, the reforming catalyst films 26 may be provided in the groove of the first substrate 21 and the groove of the second substrate 22.

Figure 10:
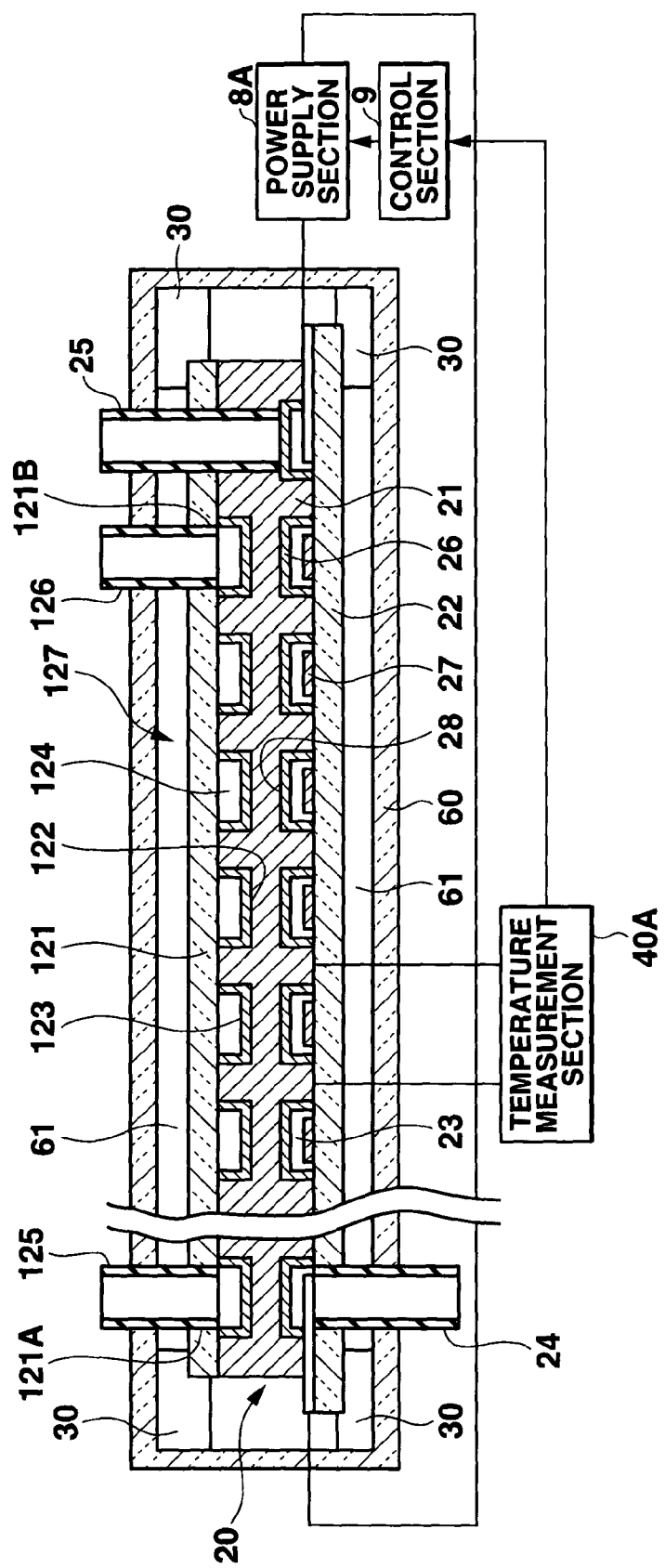
FIG. 10 is a schematic sectional view showing a modification of the reformer.

The thin film heater 27 made of a resistive element thin film heats the reforming catalyst film 26 and the micro flow path 23 in the micro reactor 20 in the embodiments described above, but as shown in FIG. 10, a combustion section 127 which combusts part of the fuel 19 may be used for heating in addition to the thin film heater 27. A groove 122 is formed in the combustion section 127 oppositely to the groove 28 in a second surface 21C of the first substrate 21 in each of the vaporization section 5, the hydrogen reforming section 11, the aqueous shift reaction section 12 and the selective oxidative reaction section 13. A combustion catalyst film 123 which promotes the combustion of the fuel 19 is formed on a surface of the groove 122 at a position opposite to the reforming catalyst film 26 of the micro reactor 20, and the combustion catalyst film 123 has a catalyst which promotes a chemical reaction that combusts combustible components in the fuel 19 flowing in.

A third substrate 121 with low thermal conduction such as glass having a thermal conductivity of 0 to 3 (W/m·K) is bonded onto the second surface 21C of the first substrate 21. In this way, a micro flow path 124 through which a fuel that can be combusted by the reforming catalyst film 123 flows is formed by a space in the groove 122 covered with the third substrate 121.

Two openings 121A, 121B penetrating in a thickness direction are provided in the third substrate 121 at positions corresponding to one end and the other end of the groove 122. The opening 121A is an entrance from which the fuel 19 flows in and coupled to an inflow pipe 125. The inflow pipe 125 is a pipe which supplies the fuel 19 taken in from the fuel sealing section 108 to the combustion section 127 of the micro reactor 20. The opening 121B is an exit which discharges the fluid produced by the combustion of the fuel 19 in the micro flow path 124 and coupled to an outflow pipe 126. The outflow pipe 126 is a pipe for disposing of the combusted fluid outside the power generation system 1.

Such heat due to a combustion reaction caused in the combustion section 127 propagates through the first substrates 21 of the micro reactors 20 in the vaporization section 5, the hydrogen reforming section 11, the aqueous shift reaction section 12, the selective oxidative reaction section 13 and the like, so as to heat the reforming catalyst film 26 and the micro flow path 23.

The fuel combusted by the combustion section 127 may be a fuel having components that are different from those in the fuel 19 reformed into hydrogen by the hydrogen reforming section 11, and may be sealed in a fuel sealing section provided in the fuel container 2 apart from the fuel sealing section 108 which seals the fuel 19.

In this way, the combustion sections 127 can rapidly heat the micro reactors 20 in the vaporization section 5, the hydrogen reforming section 11, the aqueous shift reaction section 12, the selective oxidative reaction section 13 and the like. The control section 9 transmits a control signal to the power supply section 8A on the basis of the temperature information in the temperature measurement section 40A to heat the thin film heater 27, thereby exactly controlling the temperature of the reforming catalyst film 26 and the micro flow path 23 in each of the micro reactor 20. More specifically, the combustion section 127 has a function to rapidly propagate a large quantity of heat to the reforming catalyst film 26 and the micro flow path 23, and the thin film heater 27 has a function to finely adjust the temperature of the reforming catalyst film 26 and the micro flow path 23. Thermal conductivity of the first substrate 21 should desirably be high and thermal conductivity of the third substrate 121 should desirably be lower than that of the first substrate so that combustion heat in the combustion section 127 is efficiently transferred to the reforming catalyst film 26 and the micro flow path 23.

At least one of the thin film heater 27 and the combustion section 127 is provided in all the vaporization section 5, the hydrogen reforming section 11, the aqueous shift reaction section 12 and the selective oxidative reaction section 13 in the present embodiments, but if the thin film heater 27 or the combustion section 127 can be used in common as heating means for a plurality of reaction sections, the number of the thin film heaters 27 can be smaller than the number of the vaporization section 5, the hydrogen reforming section 11, the aqueous shift reaction section 12 and the selective oxidative reaction section 13, and the number of the combustion sections 127 can be smaller than the number of the vaporization section 5, the hydrogen reforming section 11, the aqueous shift reaction section 12 and the selective oxidative reaction section 13.

The fuel applied to the fuel-reforming type fuel cell presently under research and development may be a fuel which is at least a liquid fuel or liquefied fuel or gas fuel containing hydrogen elements and from which electric energy can be generated by the fuel cell section 4 at a relatively high energy conversion efficiency, and fluid materials that can be satisfactorily applied include alcoholic liquid fuels such as ethanol and butanol in addition to methanol mentioned above, liquid fuels made of hydrocarbons which are vaporized at ordinary temperature and at atmospheric pressure, for example, liquefied gases such as dimethyl ether, isobutane and natural gas (CNG), and a gas fuel such as a hydrogen gas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reformer comprising:
   a micro reactor comprising a flow path for a fluid;
   a sealed container which accommodates the micro reactor and keeps an atmosphere on a periphery of the micro reactor at a pressure lower than external pressure;
   an inlet pipe and an outlet pipe which are connected to the flow path of the micro reactor, and which extend outward from the container and are sealed to the container; and
   adsorption means for adsorbing a medium which is present inside the container, the adsorption means being located apart from the inlet pipe, the outlet pipe and the micro reactor.

2. The reformer according to claim 1, further comprising: heating means for generating heat to heat the micro reactor.

3. The reformer according to claim 1, wherein the reformer is manufactured by accommodating the micro reactor in the container under a heated atmosphere.

4. The reformer according to claim 1, further comprising: heating means for heating the micro reactor for a reaction in the micro reactor and for heating an atmosphere in the container for exhausting the atmosphere when the micro reactor is accommodated in the container.

5. The reformer according to claim 1, wherein the micro reactor comprises a reactor which changes the fluid from a liquid phase to a gas phase.

6. The reformer according to claim 1, wherein the micro reactor comprises a reforming reactor which produces hydrogen from the fluid.

7. The reformer according to claim 1, wherein the micro reactor comprises a reforming reactor which reforms carbon monoxide in the fluid into carbon dioxide.

8. The reformer according to claim 1, further comprising temperature measurement means for measuring a temperature of the micro reactor.

9. The reformer according to claim 1, wherein the adsorption means comprises a polyimide-based material.

10. The reformer according to claim 1, wherein the adsorption means comprises a porous film.

11. The reformer according to claim 1, wherein the adsorption means comprises a surface coated with a material which physically adsorbs water or oxygen.

12. The reformer according to claim 1, wherein the adsorption means comprises a surface coated with a material which chemically adsorbs water or oxygen.

* * * * *